United States Patent
Muff et al.

(10) Patent No.: US 9,218,039 B2
(45) Date of Patent: *Dec. 22, 2015

(54) CHIP LEVEL POWER REDUCTION USING ENCODED COMMUNICATIONS

(71) Applicant: International Business Machines Corporation, Armonk, NY (US)

(72) Inventors: Adam J. Muff, Issaquah, WA (US); Paul E. Schardt, Rochester, MN (US); Robert A. Shearer, Woodinville, WA (US); Matthew R. Tubbs, Issaquah, WA (US)

(73) Assignee: International Business Machines Corporation, Armonk, NY (US)

( * ) Notice: Subject to any disclaimer, the term of this patent is extended or adjusted under 35 U.S.C. 154(b) by 222 days.

This patent is subject to a terminal disclaimer.

(21) Appl. No.: 13/785,423

(22) Filed: Mar. 5, 2013

(65) Prior Publication Data

US 2014/0173308 A1    Jun. 19, 2014

Related U.S. Application Data

(63) Continuation of application No. 13/714,796, filed on Dec. 14, 2012.

(51) Int. Cl.
  *G06F 1/32* (2006.01)
(52) U.S. Cl.
  CPC .................................... *G06F 1/3203* (2013.01)

(58) Field of Classification Search
  None
  See application file for complete search history.

(56) References Cited

U.S. PATENT DOCUMENTS

| | | | | |
|---|---|---|---|---|
| 4,488,142 | A | * | 12/1984 | Franaszek ...................... 341/59 |
| 5,790,874 | A | * | 8/1998 | Takano et al. ................. 713/320 |
| 7,440,316 | B1 | | 10/2008 | Lee et al. |
| 7,979,666 | B2 | | 7/2011 | Rixner et al. |
| 7,990,777 | B2 | | 8/2011 | Rha |
| 2007/0217312 | A1 | * | 9/2007 | Newcomb et al. .......... 369/59.13 |
| 2008/0043855 | A1 | | 2/2008 | Krishnan et al. |
| 2008/0294820 | A1 | * | 11/2008 | Croxford ....................... 710/105 |
| 2009/0193159 | A1 | * | 7/2009 | Li et al. ............................ 710/35 |
| 2010/0153574 | A1 | * | 6/2010 | Lee et al. ....................... 709/231 |

\* cited by examiner

*Primary Examiner* — Thomas Lee
*Assistant Examiner* — Chad Erdman
(74) *Attorney, Agent, or Firm* — Middleton Reutlinger (57) ABSTRACT

A circuit arrangement, method, and program product communicate data over a communication bus by selectively encoding data values queued for communication over the communication bus based at least in part on at least one data value queued to be communicated thereafter and at least one previously communicated encoded data value to reduce bit transitions for communication of the encoded data values. By reducing bit transitions in the data communicated over the communication bus, power consumption by the communication bus is likewise reduced.

9 Claims, 9 Drawing Sheets

CHIP LEVEL POWER REDUCTION USING ENCODED COMMUNICATIONS

CROSS-REFERENCE TO RELATED APPLICATIONS

This application is a continuation of U.S. patent application Ser. No. 13/714,796, filed on Dec. 14, 2012 by Adam J. Muff et al. (ROC920120173US1), the entire disclosures of which are incorporated by reference herein.

FIELD OF THE INVENTION

The invention is generally related to data processing in a computing system including a plurality of interconnected processing blocks (i.e., nodes), and in particular to processor architectures and communication architectures incorporated therein.

BACKGROUND

A network on a chip (NOC) is a novel integrated circuit architecture that applies a network-based architecture to a single chip to create a unique processing unit. A typical NOC includes a plurality of integrated processor (IP) blocks coupled to one another via the network. NOC processing units typically distribute (i.e., allocate) various parts of a job to different hardware threads of one or more IP blocks to be executed by the one or more IP blocks in the NOC processing unit, where the distribution typically includes transmitting data packets including one or more data words between one or more hardware threads of the NOC. With the number of IP blocks in the standard computer systems expected to rise, efficiently handling workload distribution has become increasingly demanding.

In many conventional NOC architecture systems, data packets are often transmitted over a communication bus/interconnect between IP blocks of the NOC. As the number of IP blocks and hardware threads configured therein continues to rise, the amount of data being communicated over the communication bus of the NOC likewise continues to rise. Improvements in the logic of IP blocks have led to power efficient processing. However, moving data, i.e., communicating data packets has not kept pace with the power reduction improvements in conventional systems. In fact, in many conventional processors, more power is now consumed moving data than performing processing on the data.

A primary source of power consumption in association with data communication results from data signals transitioning between logical "1" and logical "0" values, as the CMOS logic gates typically used in most NOC architecture systems dissipate the most power when switching between logic states. Thus, as the speed of communication bus increases, and the amount of communicated data increases, the overall power consumption of the NOC rises accordingly.

Therefore, a continuing need exists in the art for a manner of increasing the efficiency of on chip communications.

SUMMARY OF THE INVENTION

The invention addresses these and other problems associated with the prior art by encoding data to be communicated over a communication bus to reduce bit transitions for communications, and thereby reduce the amount of switching of logic gates in the communication bus, as well as the associated power consumption that comes from such switching. The encoding is based both on historical and future data communications, such that the encoding selected for a particular data value is based on both the data transmitted prior to, and subsequent to, that data value.

In particular, embodiments of the invention selectively encode data values based at least in part on at least one data value queued to be communicated thereafter and a previously communicated encoded data value. Each data value is encoded to a particular encoded data value of a group of possible encoded data values that correspond to the data value. By encoding the data values prior to communication to reduce bit transitions in the communicated data, embodiments of the invention reduce the switching of logic gates in the communication bus, where reducing switching in turn reduces power consumption in the processor.

These and other advantages and features, which characterize the invention, are set forth in the claims annexed hereto and forming a further part hereof. However, for a better understanding of the invention, and of the advantages and objectives attained through its use, reference should be made to the drawings, and to the accompanying descriptive matter, in which there is described exemplary embodiments of the invention.

It should be understood that the appended drawings are not necessarily to scale, presenting a somewhat simplified representation of various preferred features illustrative of the basic principles of embodiments of the invention. The specific features consistent with embodiments of the invention disclosed herein, including, for example, specific dimensions, orientations, locations, sequences of operations and shapes of various illustrated components, will be determined in part by the particular intended application, use and/or environment. Certain features of the illustrated embodiments may have been enlarged or distorted relative to others to facilitate visualization and clear understanding.

DETAILED DESCRIPTION

Embodiments of the invention provide a circuit arrangement and method for communicating data over a communication bus/interconnect. Data values queued to be communicated may be selectively encoded to a particular encoded data value based at least in part on a data value queued to be communicated thereafter and a previously communicated encoded data value. Each data value is encoded to the particular encoded data value of a group of possible encoded values, where the particular encoded value reduces the number of bit transitions for communicating the encoded data values. By selectively encoding each data value to the particular encoded value that reduces bit transitions, embodiments of the invention thereby reduce switching during communication, which in turn may reduce power consumption as compared to communicating the unencoded data values.

Hardware and Software Environment

Figure 1:
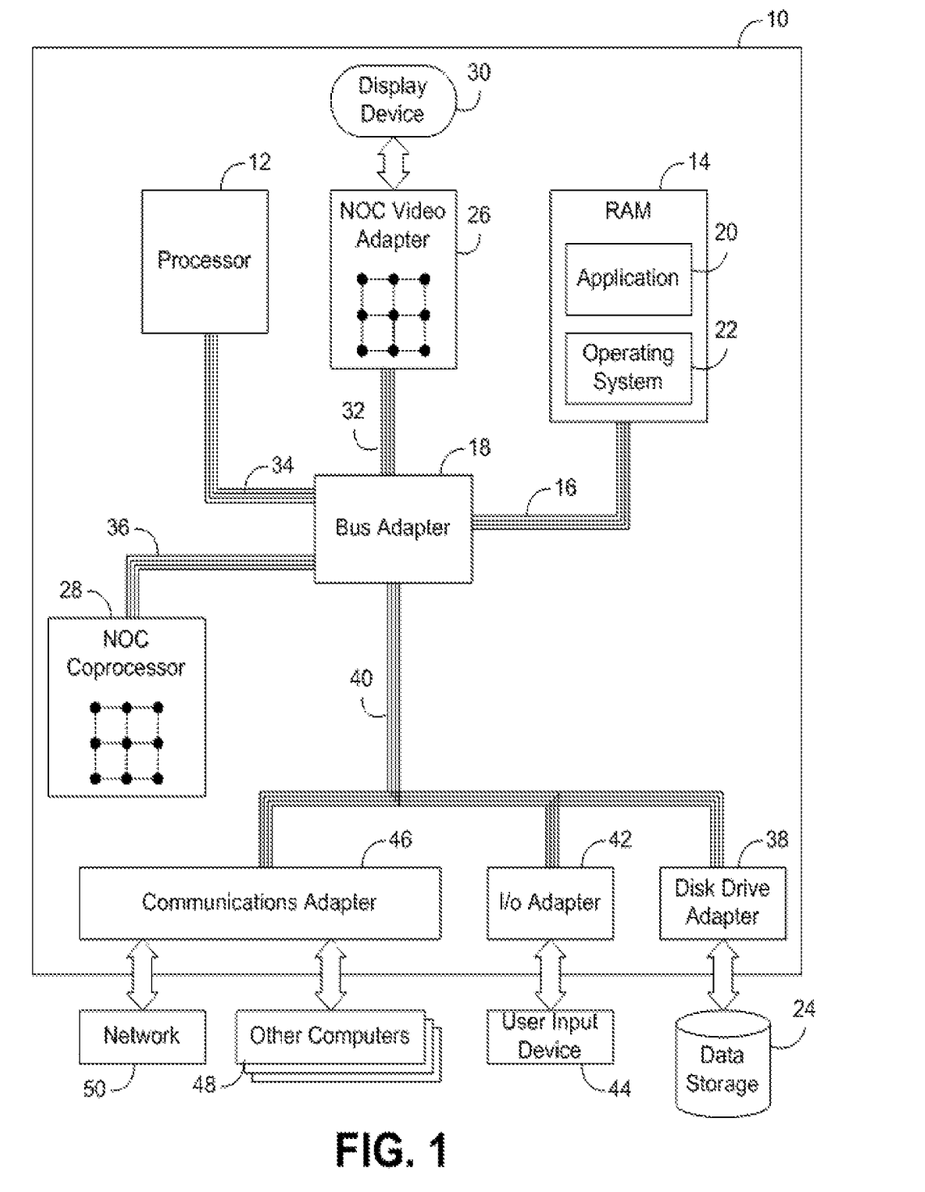
FIG. 1 is a block diagram of exemplary automated computing machinery including an exemplary computer useful in data processing consistent with embodiments of the present invention.

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™, Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
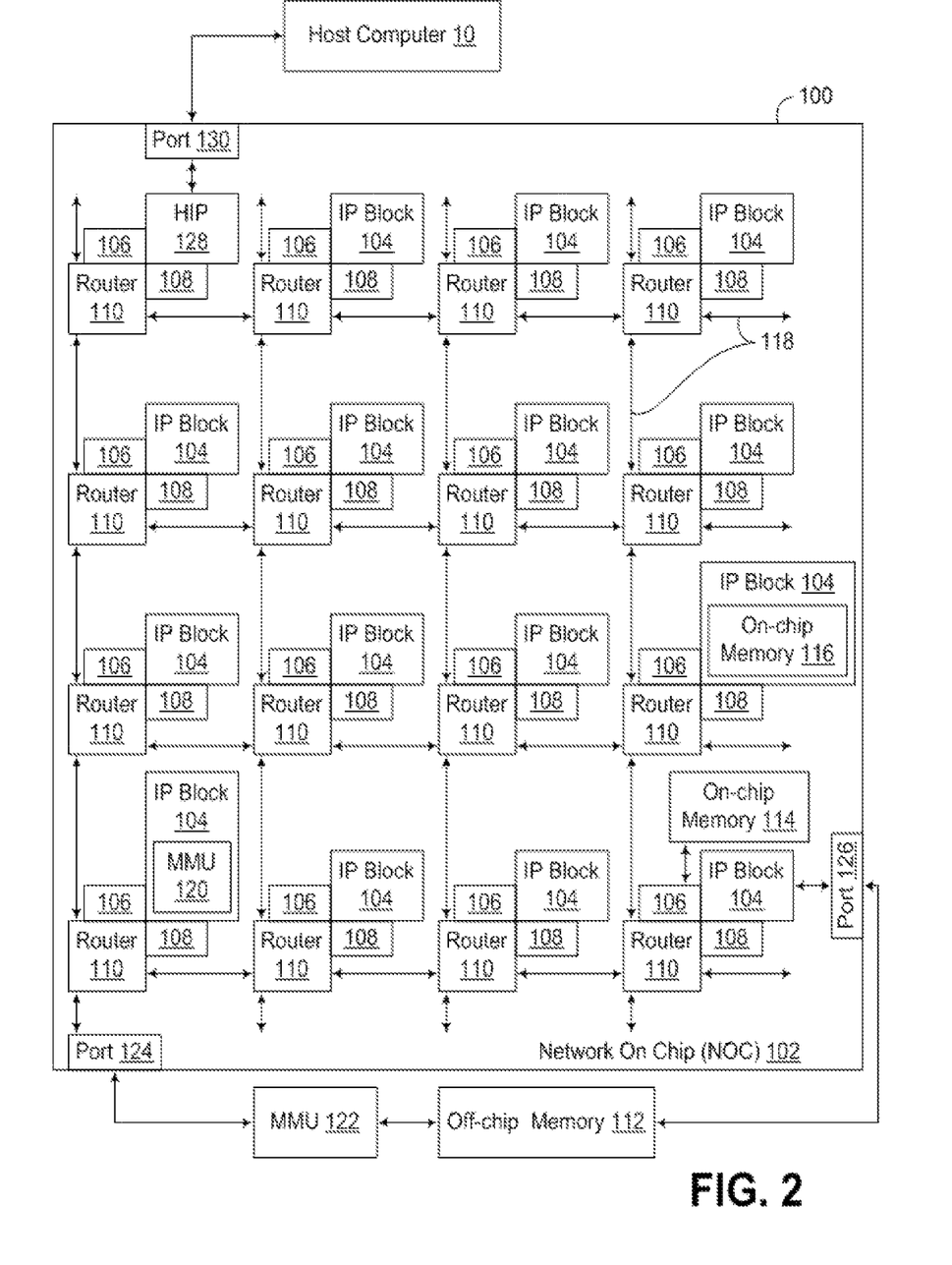
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices, data processing systems utilizing such devices, and other tangible, physical hardware circuits, those of ordinary skill in the art having the benefit of the instant disclosure will appreciate that the invention may also be implemented within a program product, and that the invention applies equally regardless of the particular type of computer readable storage medium being used to distribute the program product. Examples of computer readable storage media include, but are not limited to, physical, recordable type media such as volatile and non-volatile memory devices, floppy disks, hard disk drives, CD-ROMs, and DVDs (among others).

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bi-directional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
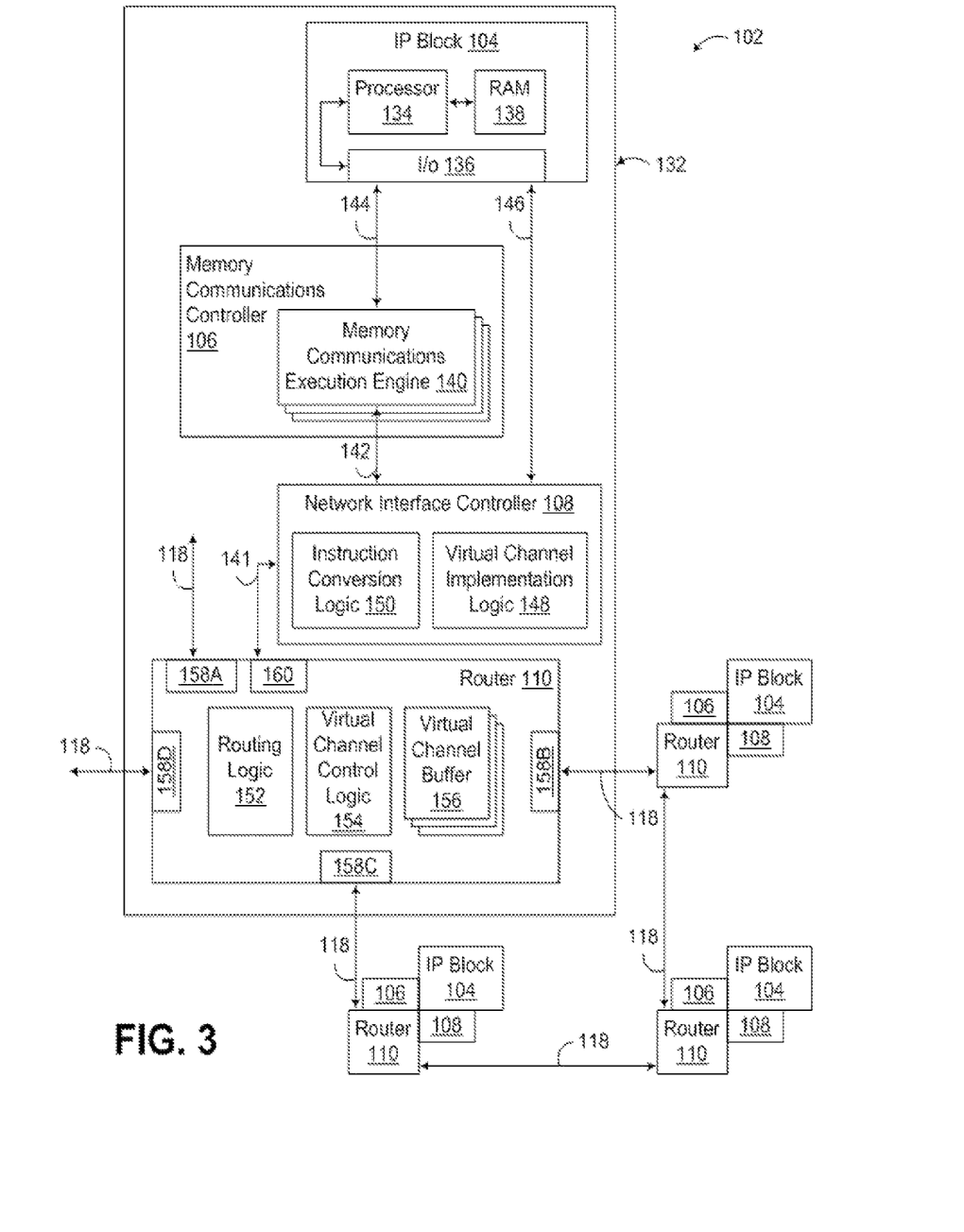
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132 which may be referred to as a node or a hardware thread. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memoryaddress-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
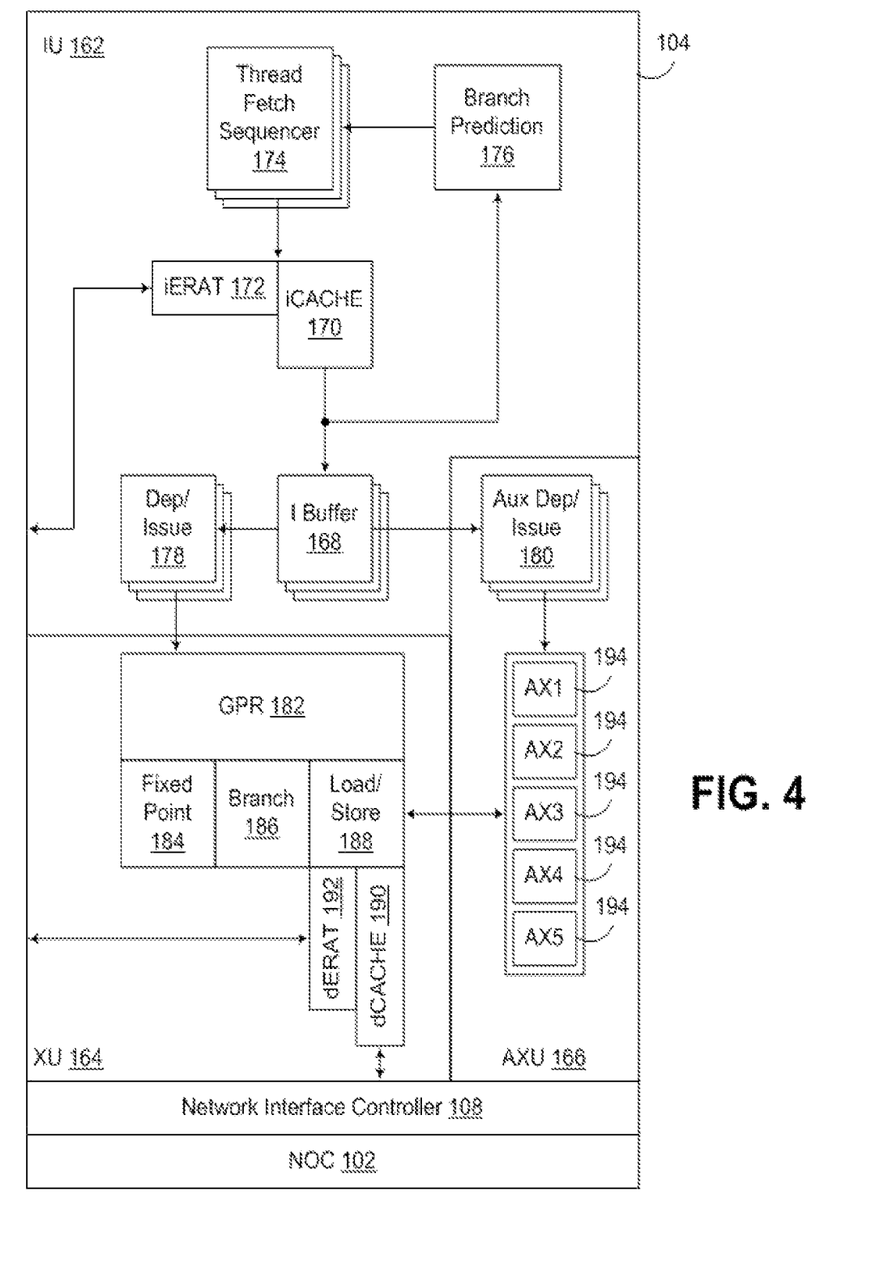
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32b or 64b PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Chip Level Encoded Data Communications

Figure 5:
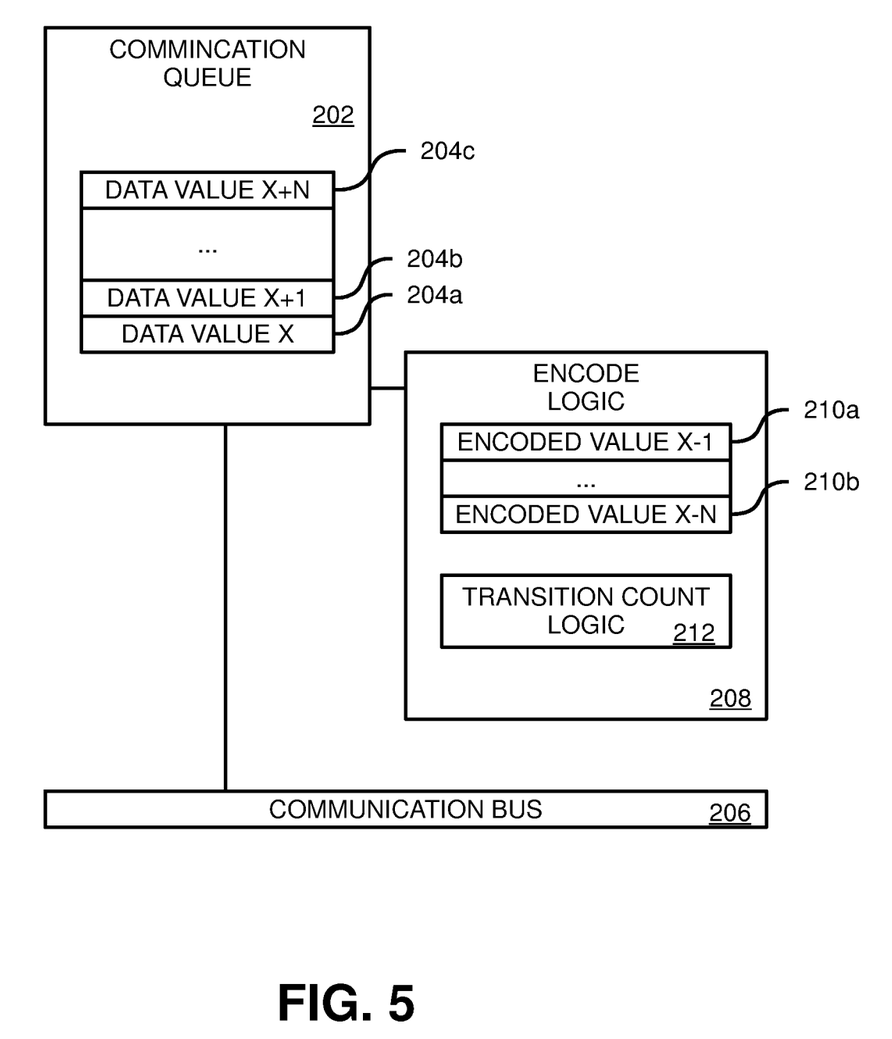
FIG. 5 is a block diagram of a of a communication queue and encode logic that may be connected to a communication bus or interconnect of the NOC of FIG. 2 to encode data values prior to communication in the NOC.

Turning now to FIG. 5, this figure provides a block diagram illustrating components that may be configured in the NOC 102, IP block 104 and/or router 110 of FIG. 2. As shown, a communication queue 202 may store data values 204a-c (also labeled 'DATA VALUE X' through 'DATA VALUE X+N') that are queued for communication over a connected communication bus 206. In general, the 'DATA VALUE X' 204a corresponds to a first data value that is to be communicated over the communication bus 206, and 'DATA VALUE X+1' 204b through 'DATA VALUE X+N' 204c corresponds to data values queued to be communicated after the first data value 204a. The communication queue 202 is connected to encode logic 208, where the encode logic may be associated with a memory that stores encoded values 210a,b (also labeled 'ENCODED VALUE X−1' through 'ENCODED VALUE X−N') that were previously communicated over the communication bus 206. Consistent with embodiments of the invention, the encode logic 208 may be connected to the communication queue 202 and/or the communication bus 206, and the encode logic 208 may be configured to encode data values (e.g., DATA VALUE X 204a) prior to communication based at least in part on one or more previously communicated encoded values 210a, b and one or more data values queued to be communicated thereafter 204b,c.

Consistent with embodiments of the invention, the encode logic 208 may analyze one or more previously communicated encoded values 210a,b and one or more data values 204b,c queued to be communicated after the first data value 204a and determine an encoded value for the first data value 204a, and in some embodiments, also determine an encoded value for a subsequent data value 204b such that bit transitions are reduced in communicating the first data value 204a and at least one other data value 204b queued to be communicated thereafter. In general, a data value may be encoded by the encode logic 208 to a particular encoded value from a group of possible encoded values prior to communication on the communication bus 206. As such, in embodiments of the invention, the encode logic analyzes the first data value 204a, one or more previously communicated encoded values 210a, b, and one or more data values queued to be communicated thereafter 204,b,c to determine a particular encoded value from the group of possible encoded values for the first data value 204a. The encode logic 208 encodes the first data value 204a to generate the particular encoded value, and the particular encoded value may be communicated over the communication bus 206.

The encode logic 208 may include transition count logic 212 that is configured to determine the number of bit transitions between at least one previously communicated encoded value 210a, each possible encoded value for the first data value 204a and/or each possible encoded value for at least one data value 204b queued to be communicated after the first data value 204a. For example, the transition count logic 212 may include 'exclusive or' (XOR) logic that compares each bit of each possible encoded value for the first data value 204a to a corresponding bit in the previously communicated encoded value 210a and a corresponding bit in each possible encoded value for a subsequently queued data value 204b to determine a number of bit transitions for each comparison. Based at least in part on the determined number of bit transitions for each possible encoded value for the first data value 204a, previously communicated encoded value 210a, and each possible encoded value for the subsequently queued data value 204b, the encode logic 208 encodes the first data value 204a to a particular encoded value from the group of possible encoded values.

Figure 6A:
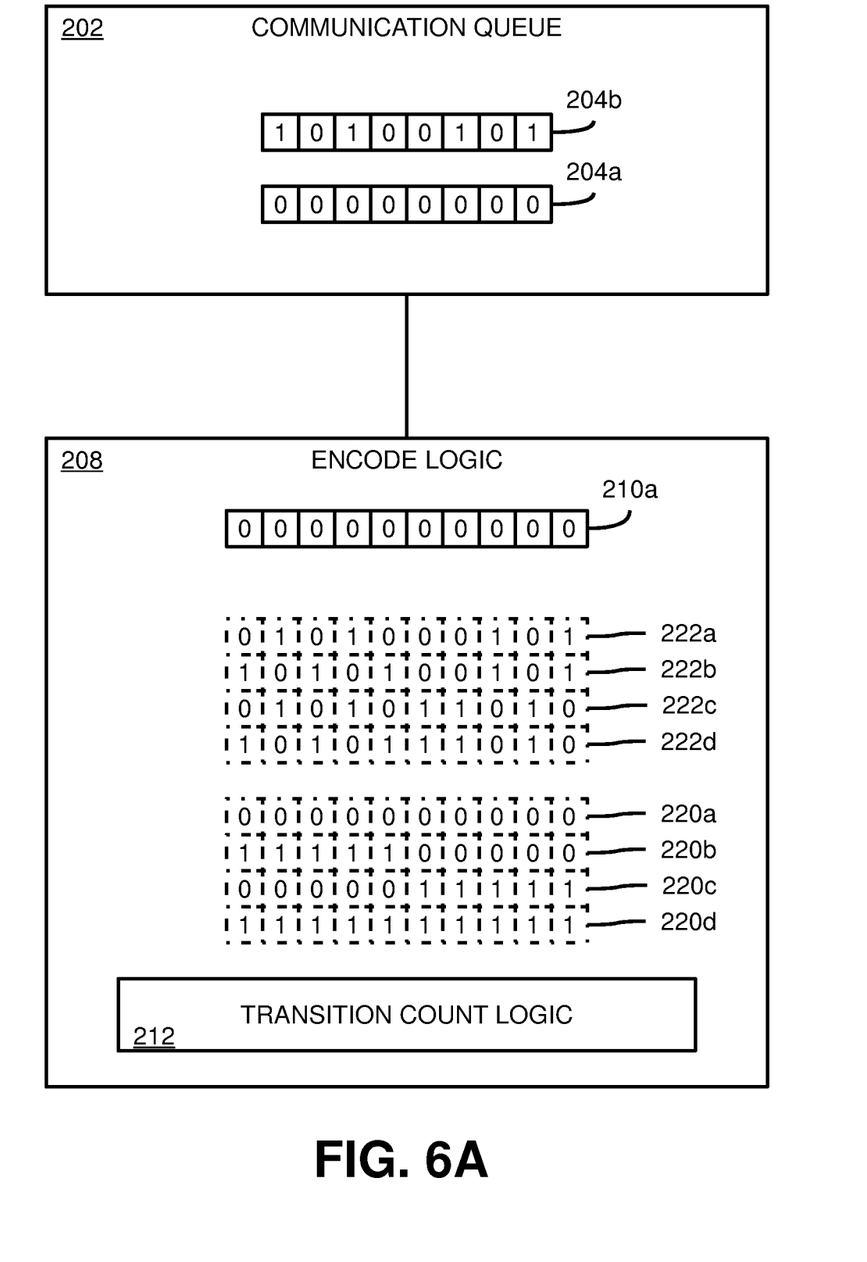
FIGS. 6A-C are block diagrams including example data values that may be encoded and communicated using the encode logic of FIG. 5.
Figure 6B:
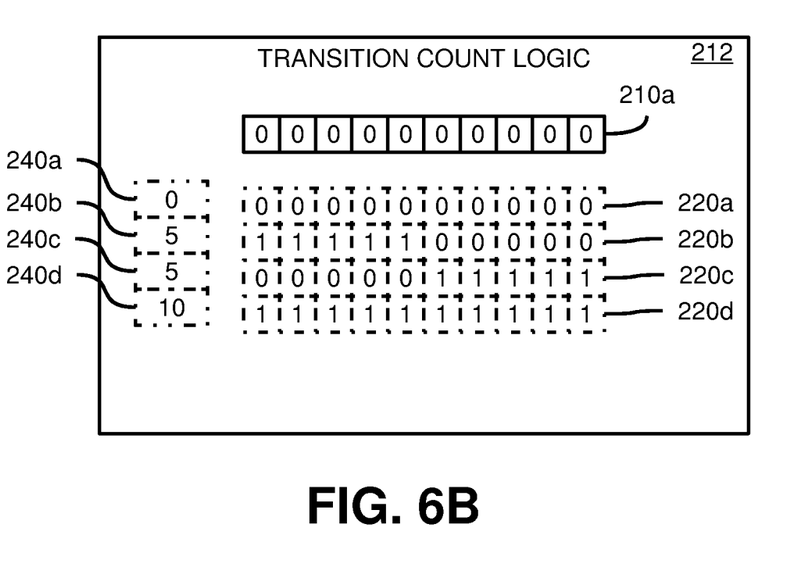
Figure 6C:
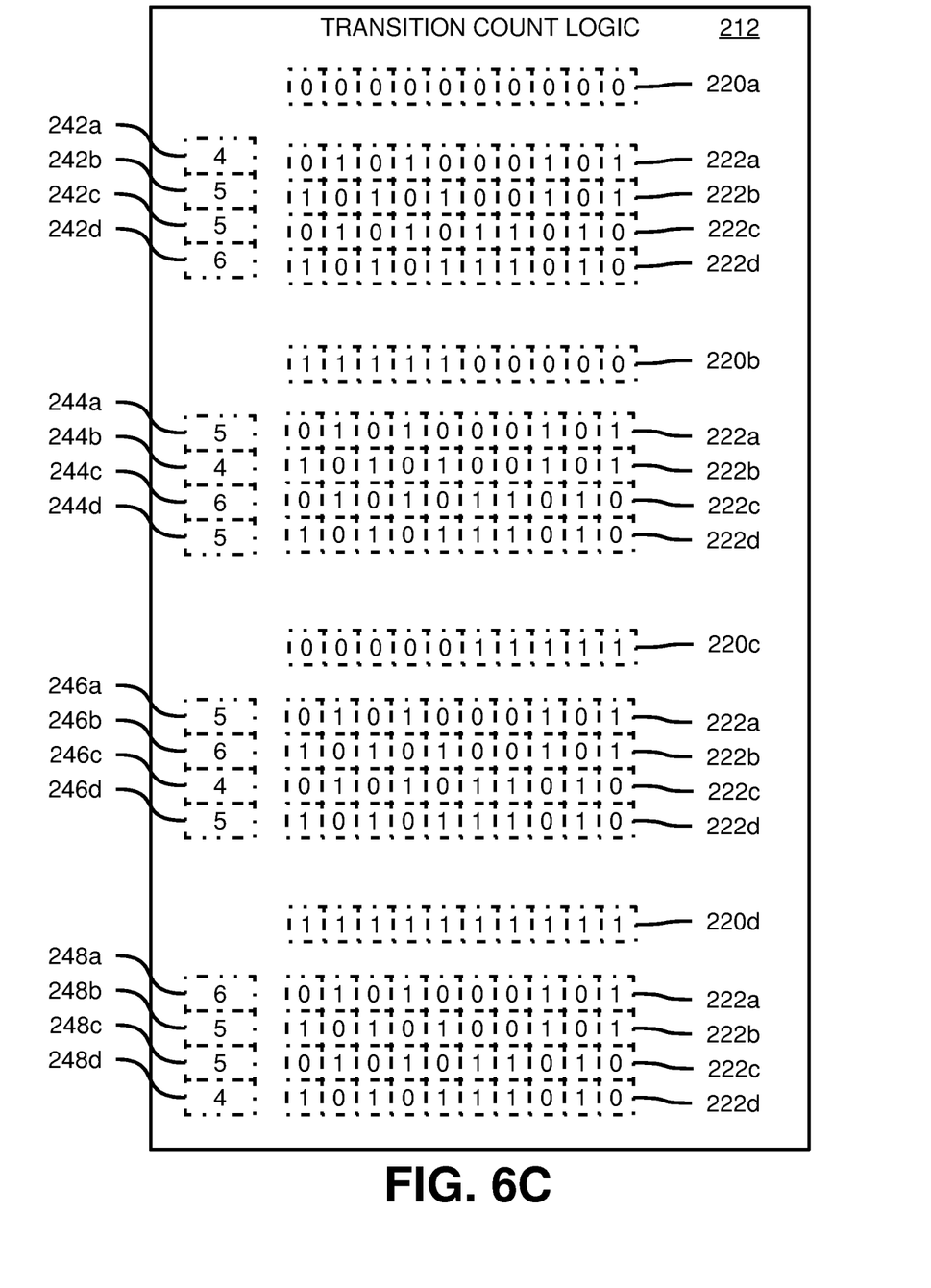

FIGS. 6A-C provides block diagrams of the communication queue 202 and encode logic 208 including an example value for the first data value 204a '00000000', a subsequently queued data value (i.e., a second data value) 204b '10100101', and a previously communicated encoded value 210a '0000000000'. Turning to FIG. 6A, in this example, the encode logic 208 is configured to perform 8/10 encoding on the first data value 204a and the second data value 204b, where the 8/10 encoding may encode each 8 bit data value 204a,b into any of four possible encoded values of 10 bits. In this example, the first data value 204a may be encoded using 8/10 encoding to generate four 10 bit possible encoded values 220a-d, and the second data value 204b may be encoded using 8/10 encoding to generate four 10 bit possible encoded values 222a-d.

As discussed, in some embodiments of the invention the transition count logic 212 may analyze each possible encoded value of the first data value 204a and the previously communicated encoded value 210a to determine the number of bit transitions for each possible encoded value and the previously communicated encoded value 210a. As shown in FIG. 6B, the transition count logic 212 may compare each bit of the previously communicated encoded value 210a to each possible encoded value 220a-d of the first data value 204a to determine the number of bit transitions 240a-d between the previously communicated encoded value 210a and each possible encoded value 220a-d for the first data value 204a. Thus, as shown in FIG. 6B, for an encoded value 220a of "0000000000" for the first data value, the number of transitions from the previously communicated value of "0000000000" is zero, since the numbers are identical. However, for the encoded values 220b, 200c of "1111100000" and "0000011111", the number of transitions is five, since five bits are switched from "0" to "1". Likewise, for the encoded value 220d of "1111111111", the number of transitions is ten, since all ten bits are switched from "0" to "1".

Moreover, the transition count logic 212 may be configured to determine the number of bit transitions between each possible encoded value for the first data value 204a and each possible encoded value for the second data value 204b (since, at this point, the encoded value for the second data value has not yet been determined). In FIG. 6C, the transition count logic 212 may compare each bit of a first possible encoded value 220a for the first data value 204a to corresponding bits of each possible encoded value for the second data value 204b to determine the number of bit transitions 242a-d therebetween. The transition count logic 212 performs a similar analysis to determine: the number of bit transitions 244a-d between a second possible encoded value 220b of the first data value 204a and each possible encoded value 222a-d of the second data value 204b, the number of bit transitions 246a-d between a third possible encoded value 220c of the first data value 204a and each possible encoded value 222a-d of the second data value 204b, and the number of bit transitions 248a-d between a fourth possible encoded value 220d of the first data value 204a and each possible encoded value 222a-d of the second data value 204b.

Based on the determined number of bit transitions 240a-d between the previously communicated encoded value 210a and the possible encoded values 220a-d for the first data value 204a shown in FIG. 6B, and the determined number of bit transitions 242a-d, 244a-d, 246a-d, 248a-d between each possible encoded value 220a-d of the first data value 204a and each possible encoded value 222a-d of the second data value 204b, the encode logic 208 may encode the first data value 204a to a particular encoded value of the possible encoded values 220a-d such that a predicted minimum number of bit transitions may performed when communicating the particular encoded value of the first data value 204a and subsequent data values over the communication bus 206. Moreover, after encoding the first data value 204a, the encode logic 208 may encode the second data value 204b to a particular encoded value of the possible encoded values 222a-d such that the minimum number of bit transitions may be performed when communicating the particular encoded value of the second data value 204b over the communication bus 206. In this example, the encode logic may encode the first data value 204a to the first possible encoded value 220a because the predicted bit transitions 240a would be zero between the previously communicated encoded value 210a and the predicted bit transitions between the first possible encoded value 220a and the possible encoded values 222a-d for the second value includes a possibility for the lowest number of bit transitions 242a (i.e., 4).

In general, embodiments of the invention selectively encode the first data value and subsequent data values based on a predicted number of bit transitions. However, the communication queue 202 is continuously loading new data values, such that the encode logic 208 is continuously analyzing and determining the number of bit transitions for the possible encoded values for queued data value. As such, the encode logic generally encodes a data value to a particular encoded value based on the predicted number of bit transitions for the loaded data values. For example, while the possible encoded value 222a for the second data value 204b corresponds to the lowest number of bit transitions 242a, the encode logic may not necessarily encode the second data value 204b to the possible encoded value 222a corresponding to the lowest number of bit transitions if a number of bit transitions for a possible encoded value for a data value queued after the second data value would perform less bit transitions if a different possible encoded value 222b-d is used. Hence, the encode logic 208 is continuously analyzing and determining the number of bit transitions for possible encoded values as the communication queue 202 loads new data values for communication, and the encode logic 208 selectively encodes data values prior to communication based on the current state of the communication queue 202 and a previously communicated encoded value 210a.

Figure 7:
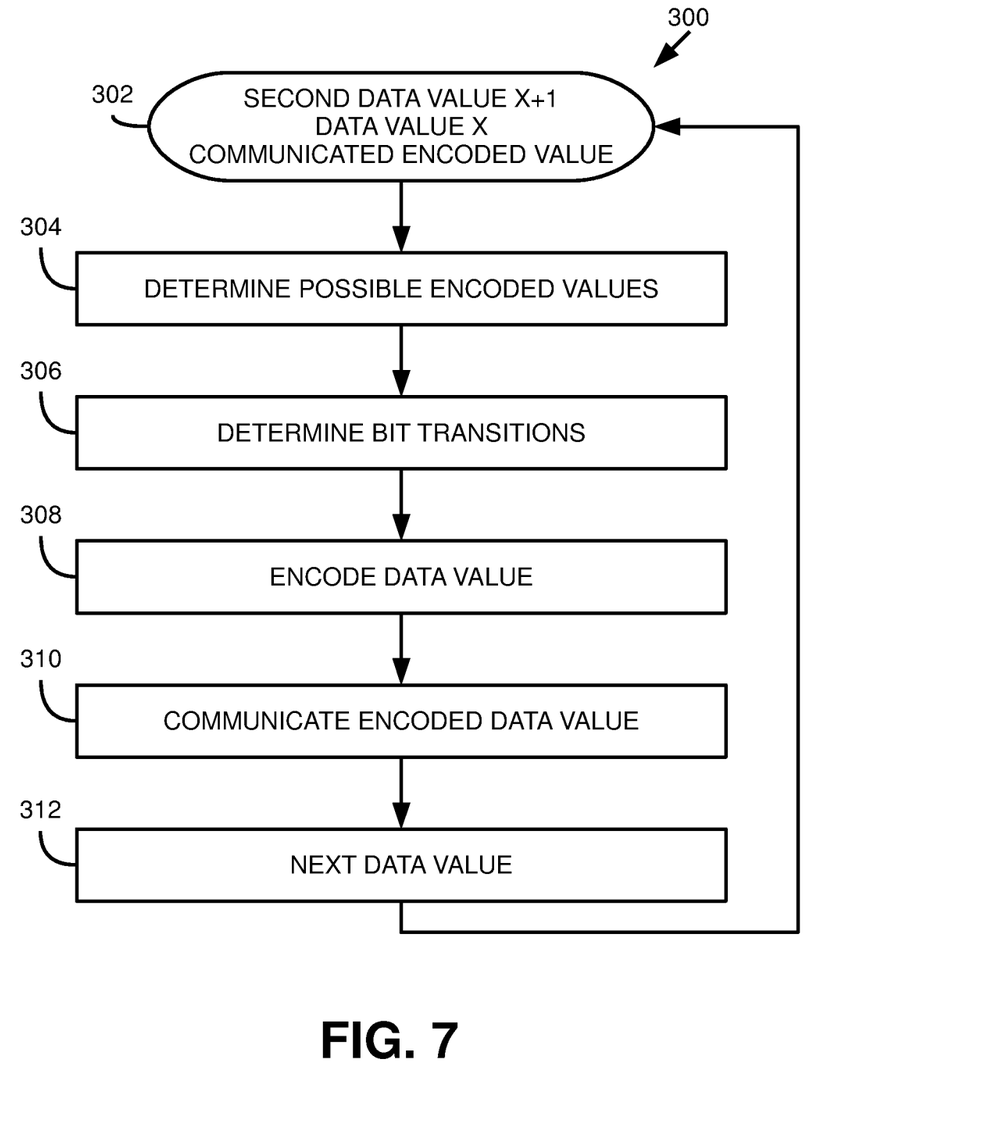
FIG. 7 provides a flowchart that illustrates a sequence of operations that may be performed by the encode logic of FIG. 5.

FIG. 7 provides a flowchart 300 that provides a sequence of operations that may be performed by embodiments of the invention when communicating data values over a communication bus and/or interconnect. Encoding logic may be connected to a communication queue that is connected to a communication bus/interconnect, and the encoding logic and may analyze data values stored in a communication queue as well as a previously communicated encoded value to encode the data values prior to communicating the data values over the communication bus to reduce the number of bit transitions in the communications.

Particularly, the encoding logic may analyze a data value queued to be communicated (i.e., 'DATA VALUE X', a first data value) a data value queued to be communicated after the first data value (i.e., 'DATA VALUE X+1', a second data value) and an encoded value that was communicated before the first data value (i.e., a communicated encoded value) (block 302) to determine possible encoded values for the first and second data values (block 304). Furthermore, the encoding logic may determine the number of bit transitions between the previously communicated encoded value and each possible encoded value of the first data value, and also between each possible encoded value of the first data value and each possible encoded value of the second data value (block 306).

Based at least in part on the determined bit transitions, the encode logic may encode the first data value to a particular encoded value of the possible encoded values for the first data value (block 308). In general, the encode logic encodes the first data value to the particular encoded value such data may be communicated over the communication bus with the minimum number of bit transitions. Hence, the encode logic determines the number of bit transitions between the previously communicated encoded value and the possible encoded values of the first data value as well as the bit transitions between each possible encoded value of the first data value and each possible encoded value of the second data value, and the first data value is encoded to the particular encoded value based at least in part on the determined number of bit transitions. The encoded value for the first data value may be communicated (block 310), and the process may repeat for the next data value in the communication queue (block 312).

As such, embodiments of the invention encode data values prior to communicating the data values over a communication bus or interconnect. For example, embodiments of the invention may perform 8/10 encoding to thereby encode 8 bits of a data value to a 10 bit encoded value and communicated the encoded value over the communication bus and/or interconnect. In general, each data value is associated with a plurality of possible encoded values, and the data value is encoded to a particular encoded value based at least in part on the encoded value communicated before the data value and the data value queued to be communicated thereafter. Embodiments of the invention encode each data value to a particular encoded value of the plurality of possible encoded values based at least in part on the number of bit transitions that would be performed communicating each possible encoded value as well as possible subsequent encoded values. By selectively encoding data values prior to communication based on at least one subsequently queued data value and a previously communicated data value, embodiments of the invention may thereby reduce transistor switching in communication logic configured in a processing system, such as a system on a chip processing unit that incorporates a NOC architecture. Reducing transistor switching, in turn may reduce power consumption in communicating the data values in the processing system as compared to communicating the data values without encoding.

Therefore, embodiments of the invention selectively encode a data value to a particular encoded value that corresponds to a low number of bit transitions and/or the minimum number of bit transitions relative to the other possible encoded values. However, since embodiments of the invention look ahead to subsequently queued data values, a queued data value may be encoded to a particular data value that does not correspond to the minimum number of bit transitions relative to the other possible encoded values but rather corresponds to a lower number of bit transitions when analyzing the possible encoded values of subsequently queued data values. By selectively encoding data values prior to communication to a particular encoded value from a group of possible encoded values that corresponds to the lowest number of bit transitions when communicating the encoded data values. As data values may be continuously communicated from the communication queue, embodiments of the invention analyze a first data value and one or more subsequently queued data values as well as a previously communicated encoded value (e.g., a last encoded value communicated) to determine the particular encoded values that the data values should be encoded to such that bit transitions are minimized. However, as the communication queue is generally loading new data values when data values are communicated, the minimum number of bit transitions may not be achieved, but rather embodiments of the invention encode the data values to lower the number of bit transitions when communicating the data values.

It will be appreciated that while 8/10 encoding is used in the illustrated embodiments, the invention may be used in connection with other widths of unencoded and/or encoded values where an unencoded value may be represented by more than one encoded value. Therefore, the invention is not limited to the particular encoding algorithm discussed herein.

Additional advantages and modifications will readily appear to those skilled in the art. Thus, the invention in its broader aspects is therefore not limited to the specific details, representative apparatus and method, and illustrative example shown and described. In particular, any of the blocks of the above flowcharts may be deleted, augmented, made to be simultaneous with another, combined, or be otherwise altered in accordance with the principles of the invention. Accordingly, departures may be made from such details without departing from the spirit or scope of applicants' general inventive concept.

What is claimed is:

1. A circuit arrangement, comprising:
a communication queue configured to store data values for communication;
a communication bus; and
encode logic connected to the communication queue and the communication bus and configured to selectively encode data values for communication over the communication bus based at least in part on at least one data value queued to be communicated thereafter and at least one previously communicated encoded data value to reduce bit transitions for communication of the encoded data values, wherein the encode logic is configured to selectively encode the data values by encoding each data value to a particular encoded data value of a group of possible encoded values for the data value, and wherein the particular encoded data value corresponds to a lowest number of bit transitions between the particular encoded data value, the previously communicated encoded data value and a possible encoded data value of a data value queued to be communicated thereafter.

2. The circuit arrangement of claim 1, wherein the encode logic includes transition count logic configured to determine a number of bit transitions between each possible encoded data value of the data value and each possible encoded data value of the at least one data value queued to be communicated thereafter.

3. The circuit arrangement of claim 2, wherein the encode logic is further configured to determine a number of bit transitions between each possible encoded data value of the data value and the previously communicated encoded data value.

4. The circuit arrangement of claim 3, wherein the encode logic is configured to selectively encode the data values by: encoding each data value to a particular encoded data value of a group of possible encoded data values associated with the data value based at least in part on the number of bit transitions between the particular encoded data value and a possible encoded value of the at least one data value queued to be communicated thereafter and the number of bit transitions between the particular encoded data value and the previously communicated encoded data value.

5. The circuit arrangement of claim 1, wherein the data values comprise 8 bits, and the encode logic is configured to selectively encode the data values by: encoding each 8 bit data value to a 10 bit encoded data value, wherein each 8 bit data value corresponds to four possible 10 bit encoded data values.

6. The circuit arrangement of claim 1, wherein the communication queue is configured to receive and store the data values in unencoded form, wherein the encode logic includes a memory for storing previously communicated encoded data values, and wherein the encode logic is further configured to store each encoded data value in the memory responsive to communicating the encoded data value.

7. The circuit arrangement of claim 1 further comprising:
a plurality of IP blocks connected to the communication bus, wherein the encode logic is coupled to a first IP block among the plurality of IP blocks and the encoded data values are communicated to a second IP block over the communication bus.

8. A program product comprising a non-transitory computer readable medium and logic definition program code resident on the computer readable medium and defining the circuit arrangement of claim 1.

9. An integrated circuit device comprising the circuit arrangement of claim 1.

* * * * *